United States Patent Office 2,720,993
Patented Oct. 18, 1955

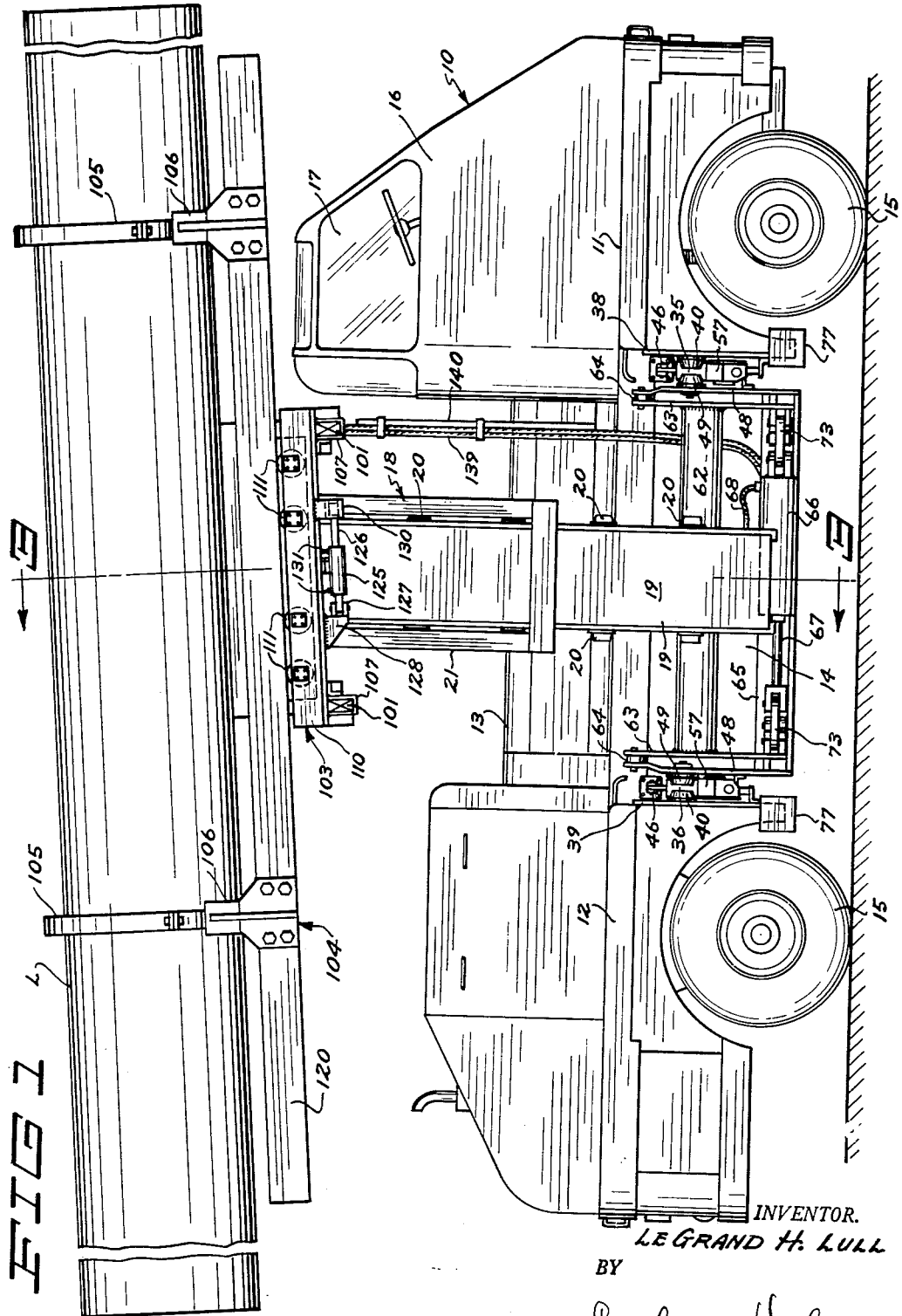

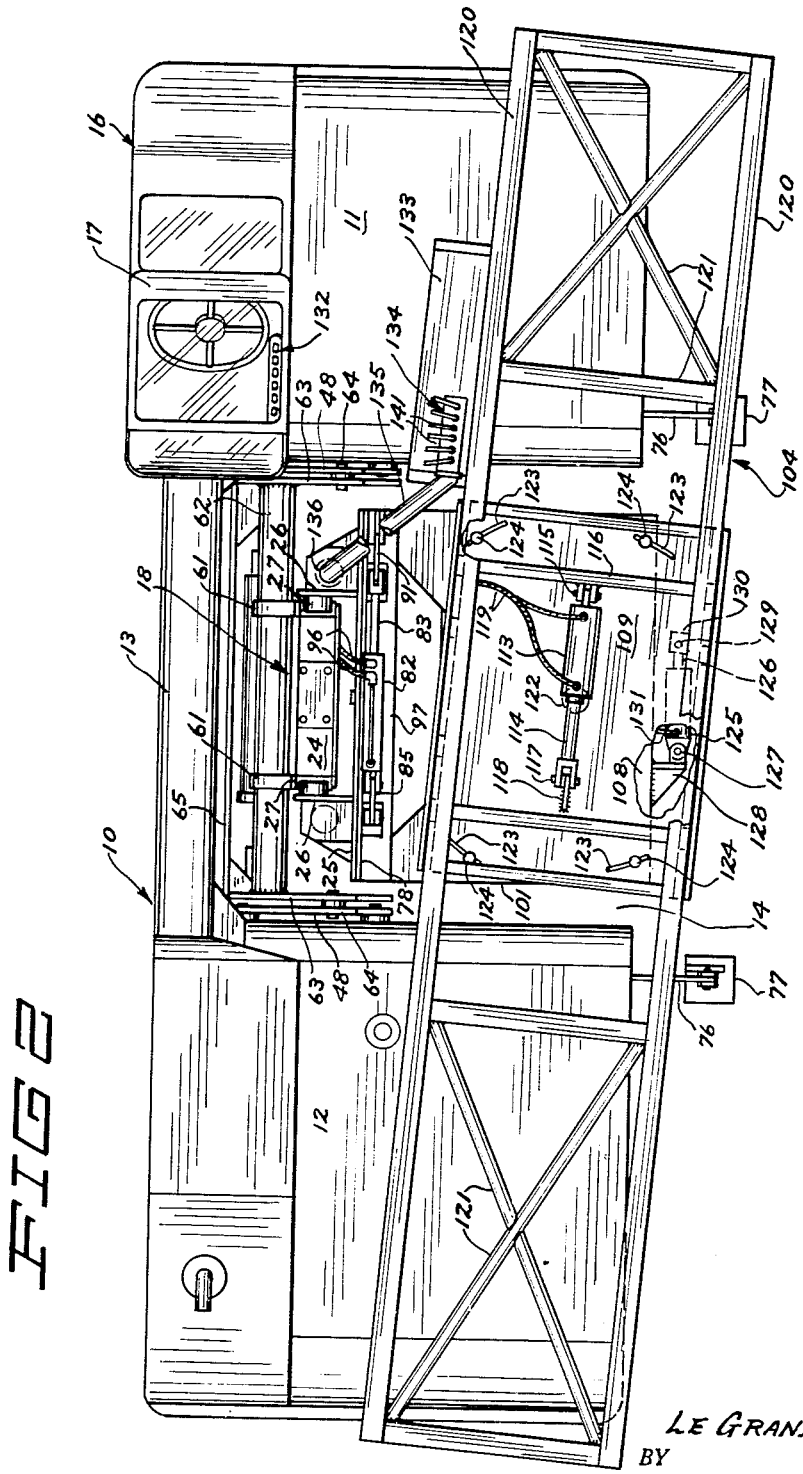

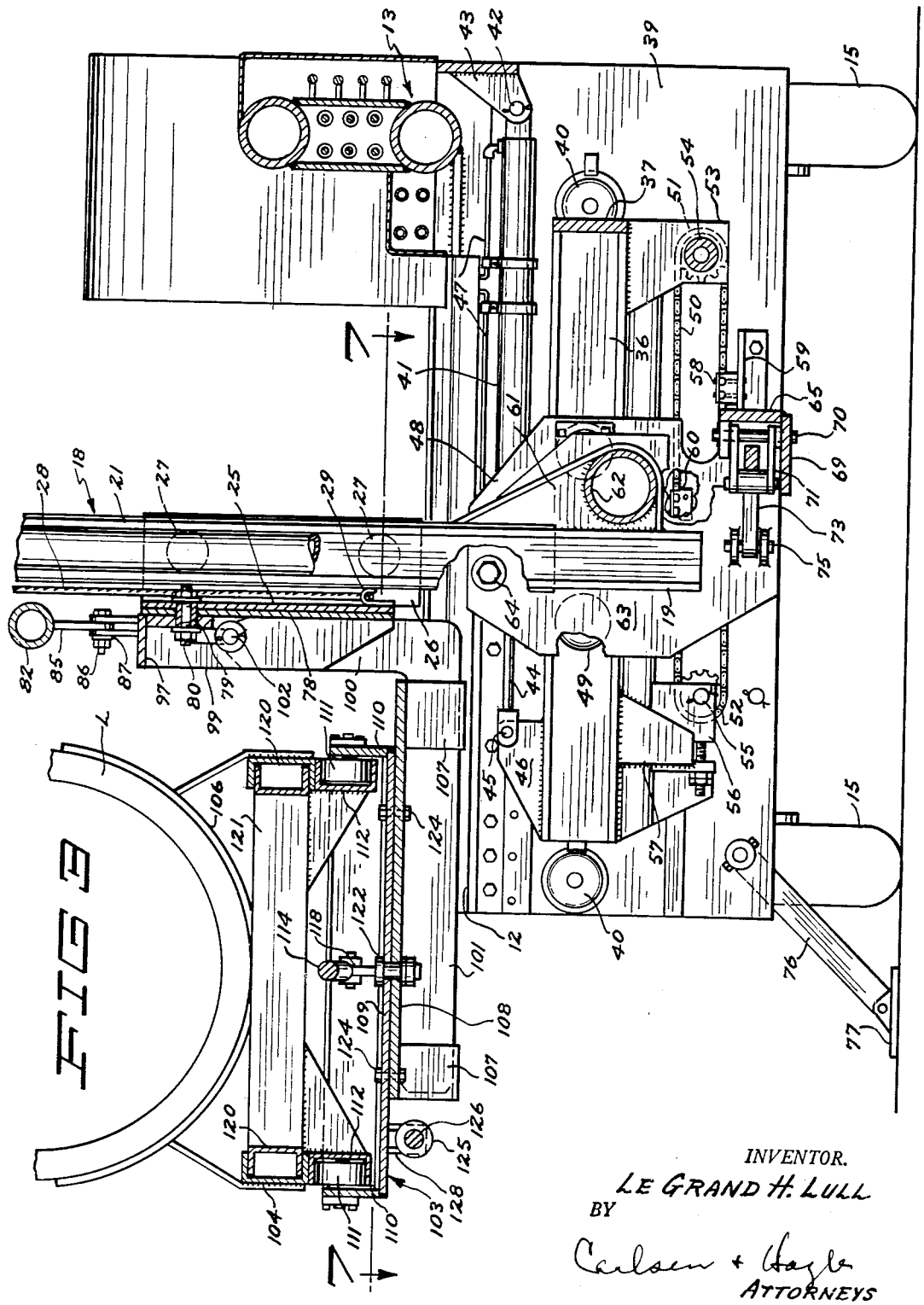

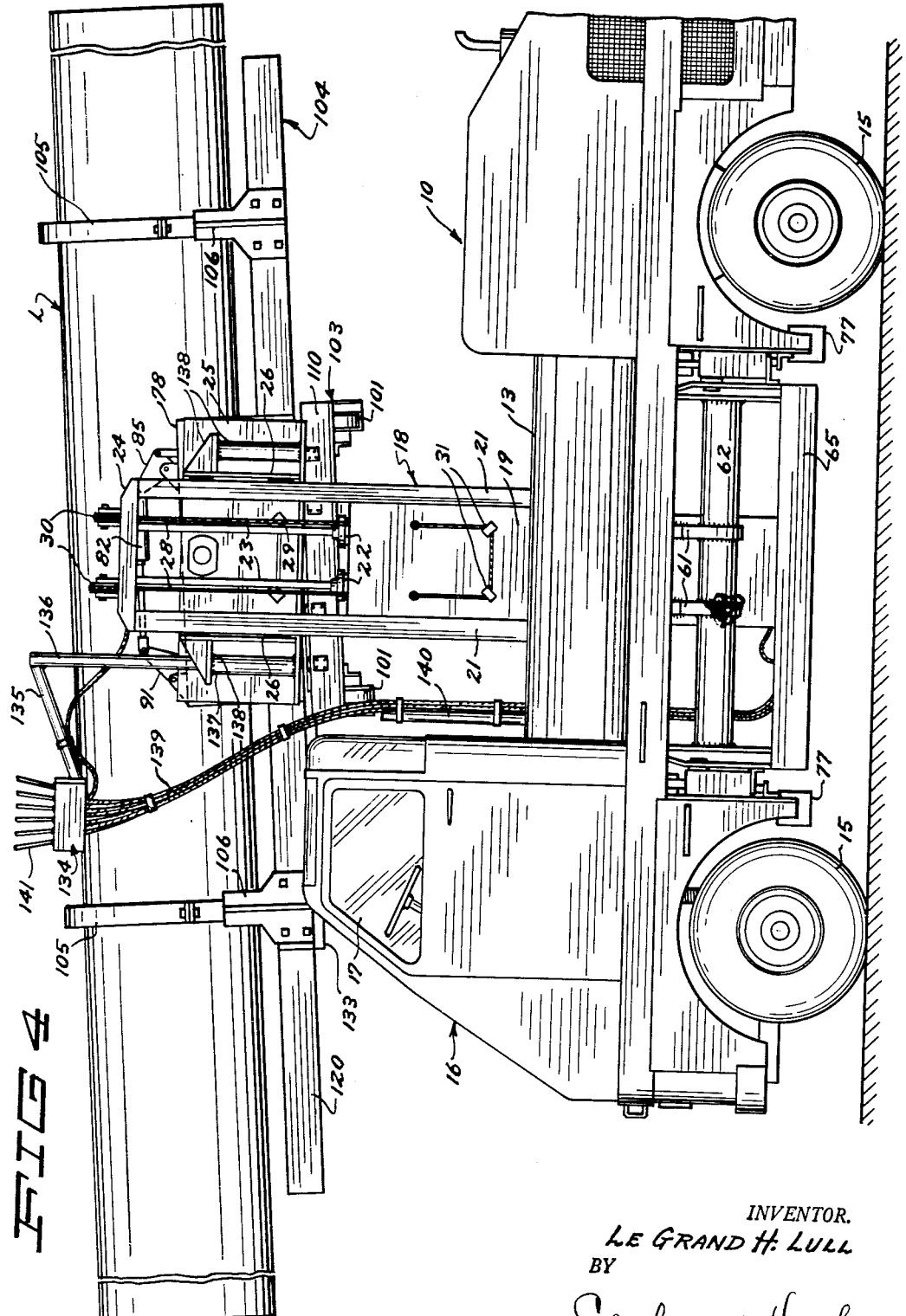

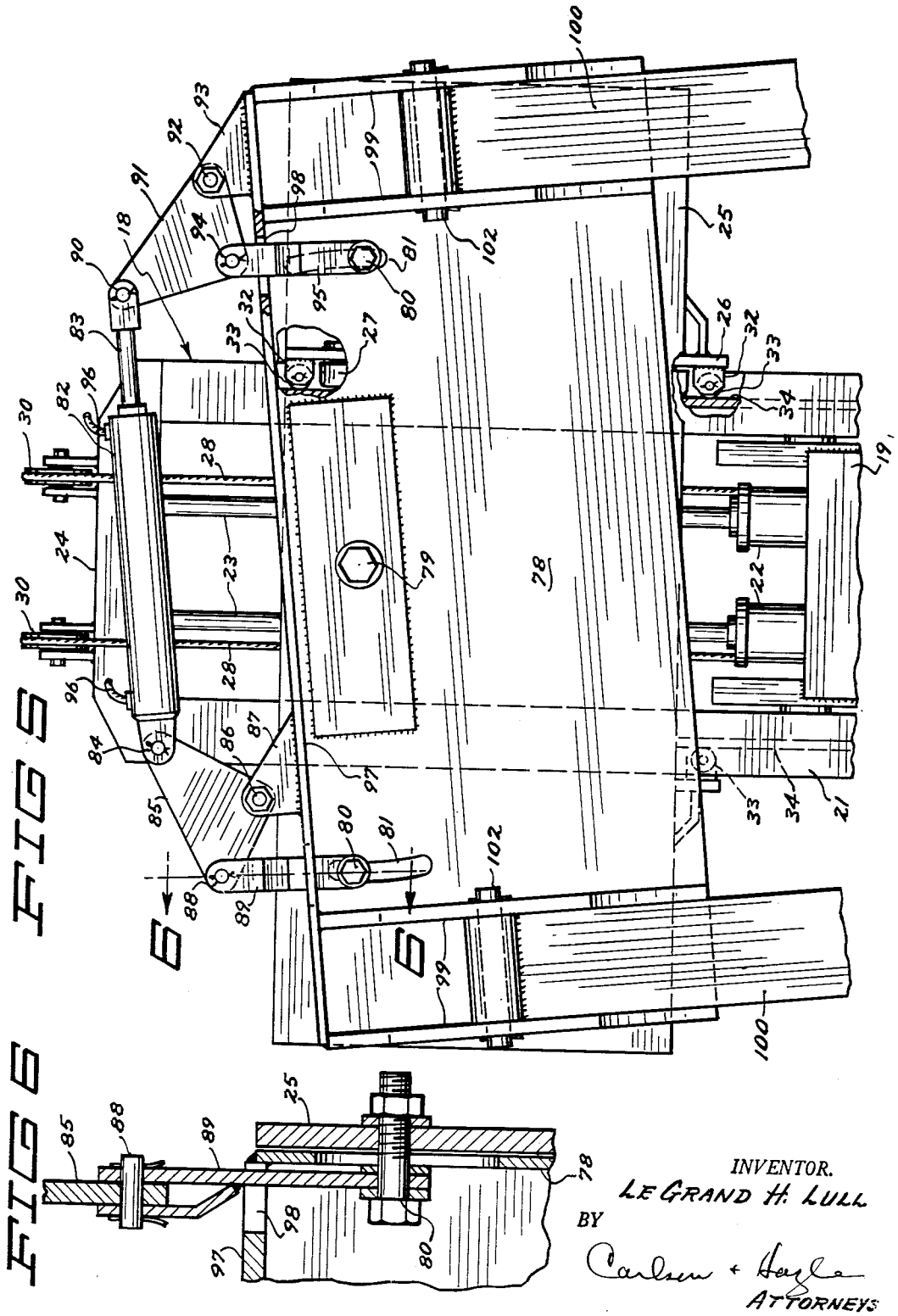

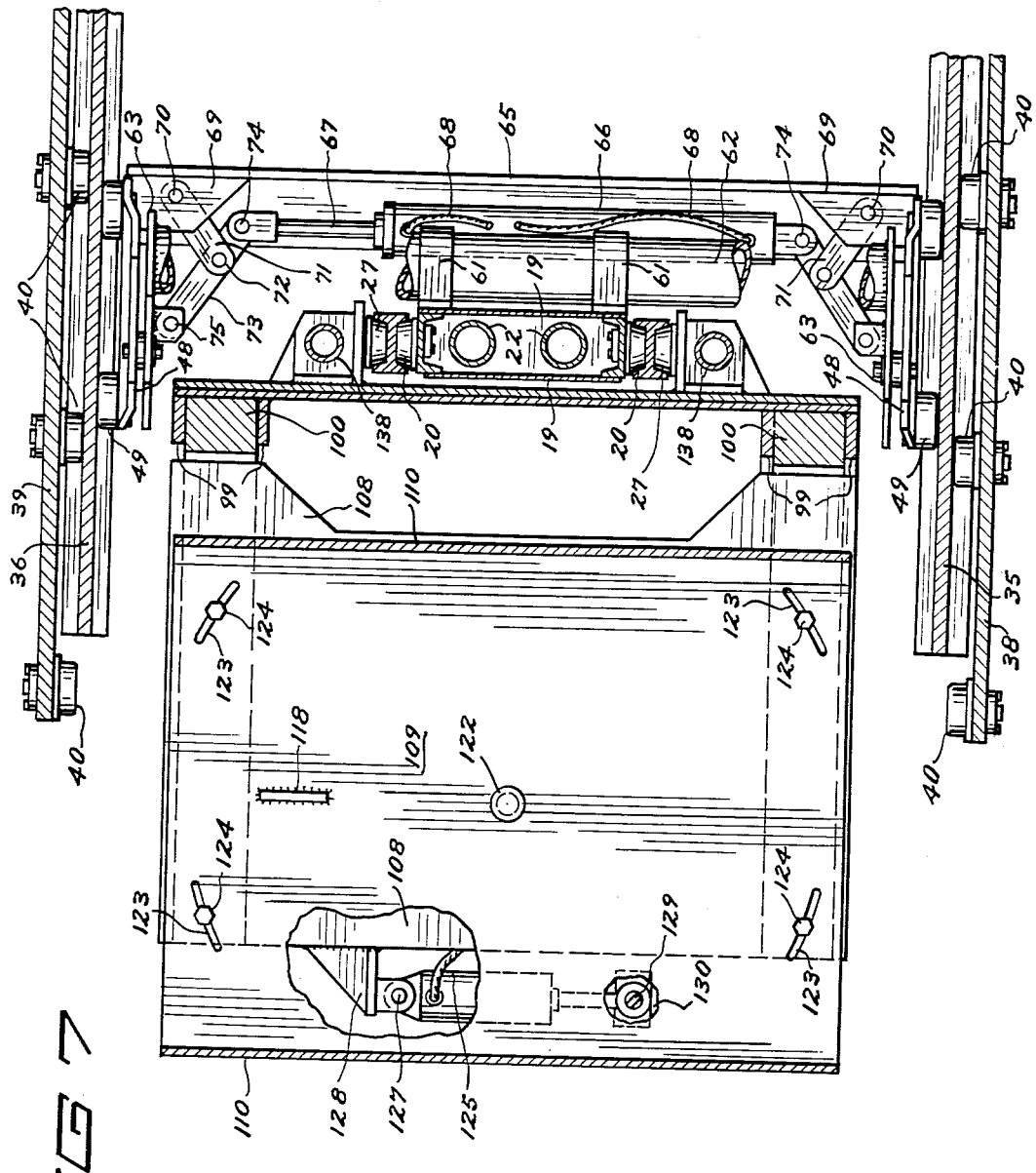

2,720,993

TRUCK MOUNTED MACHINE FOR LOADING AND MANIPULATING MATERIALS

Le Grand H. Lull, Minneapolis, Minn., assignor to 1250 West 80th Street Corporation, a corporation of Ohio Application December 12, 1951, Serial No. 261,228

12 Claims. (Cl. 214—670)

This invention relates to improvements in machines for loading and handling materials and loads of all kinds, and particularly lengthy and heavy loads which must be accurately positioned for stacking and the like. In general the machine constituting the present invention is similar to that disclosed in my prior application Serial No. 139,912, filed January 21, 1950, now Patent No. 2,621,812, and further embodies the general principles of the machine disclosed in my earlier filed application Serial No. 56,071, filed October 23, 1948 now Patent No. 2,621,811. The actual, vertically movable tower structure is furthermore essentially identical to that shown in my Patent No. 2,394,458, issued February 6, 1946.

The primary object of my present invention is to provide a machine wherein the ultimate load holder, whether it be a fork, skid, sling or the like, may be accurately positioned in no less than six different directions or planes, selectively or simultaneously, under hydraulic control and in such fashion as to raise and lower the load, traverse it transversely of the direction of travel of the machine, tilt it with respect to the machine, translate it or move it lengthwise, pitch it or tilt it in a longitudinal plane, and finally yaw it in a horizontal plane. Accurate and precise control of all of these various movements will permit the operator to position the load for starting, for loading or for mounting in a surrounding structure, and the machine is of such capacity that very long and very heavy loads may be so handled.

Another object of my present invention is to provide a simple mounting and actuating mechanism for the load carrier whereby the translate, pitch and yaw motions aforesaid may be given the load, in addition to the three motions possible in the machine of my application Serial No. 139,912, and to embody these mounting and actuating means in the form of an attachment for the load carrier, in connection with a load holder or skid structure particularly suited to handling of long materials and loads. Such holder or skid structure further includes, in accordance with this object, a platform on which an operator may stand close to the load as it is elevated and positioned, with duplicate controls for all of the six motions under the hand of the operator riding with the load.

These and other more detailed and specific objects will be disclosed in the course of the following specification, reference being had to the accompanying drawings, in which—

Fig. 1 is a side elevation of a machine according to my present invention and showing for purposes of illustration an elongated, cylindrical load supported in the load holder in an elevated and tilted or pitched position.

Fig. 2 is a plan view of the machine with the load itself removed in order to expose the details of the load holder and showing the latter swung about or yawed to an angular position with reference to the direction of travel of the machine.

Fig. 3 is an enlarged fragmentary vertical cross-sectional view taken substantially along the line 3—3 in Fig. 1, but with the load in a relatively lowered position.

Fig. 4 is a side elevation viewing the machine from the opposite side as compared to the showing in Fig. 1.

Fig. 5 is an enlarged side elevational view of the upper portion of the loader structure, per se, with the load holder omitted and illustrating the mechanism by which the load is angularly tilted or pitched.

Fig. 6 is an enlarged sectional detail view taken substantially along the line 6—6 in Fig. 5.

Fig. 7 is a horizontal sectional and plan view substantially along the line 7—7 in Fig. 3.

Referring now more particularly and by reference characters to the drawing, the material loading and manipulating machine as disclosed therein comprises a main vehicular frame, designated generally at 10, having front and rear supports or platforms 11 and 12 which are joined at one side of the machine by a heavy backbone structure 13. This construction of the frame forms an opening 14 between the supports 11—12 in which is mounted the loading mechanism as will be presently described, and beneath these supports I provide ground wheels 15, the rear pair of which is driven by an engine located on and enclosed by the rear support, as more particularly pointed out in my copending application Serial No. 139,912. In fact this vehicular and self-propelled frame structure or vehicle is almost exactly identical with that disclosed in the prior application, except that the forwardly and laterally located operator's station, designated generally at 16, is herein shown as provided with an enclosed cab 17. The construction accordingly will not be described in detail herein except where necessary to bring out the construction and operation of the loader constituting the present invention.

Arranged in the aforesaid opening 14 is a loader mechanism, which is designated generally at 18, and the load elevating portion of which is essentially identical to that disclosed in my prior Patent No. 2,394,458. This load elevator has a vertical, collapsible and telescoping tower comprising an inner section 19 having rollers 20 at its sides, upon which is guided an outer tower section 21 for up and down movements. For thus moving the outer tower section 21 I provide a pair of hydraulic rams, having cylinders 22 based at their lower ends at the bottom of the inner tower section 19, and having their upwardly extended reciprocating plungers 23 attached to a header 24 which caps the upper end of the tower section 21. Thus it will be apparent that the upward projection of the plungers 23 will elevate the tower section 21, while the downward movement of these plungers will permit the tower to collapse or telescope in the downward direction. Also forming part of this tower is an upwardly and downwardly movable mounting member or plate 25, having front and rear flanges 26 and these flanges are fitted with rollers 27 which are guided in channels along the opposite edges of the tower section 21. Cables 28 are secured to this mounting plate 25, as indicated at 29, from which point the cables run upwardly over head pulleys 30 atop the header 24 and downwardly along what may be called the back of the loader to points 31 at which the cables are secured to the inner tower section 19. Thus as the outer tower section 21 is elevated the mounting plate 25 will be carried along, but the resulting pull upon the cables 28 will also move this mounting plate upward to obtain a maximum elevation of the load. As stated, this loader construction, per se, is very similar to that disclosed in my earlier patent to which attention is invited for further details of its construction and operation. It is to be noted, however, that as shown in Fig. 5 the mounting plate 25 projects forwardly and rearwardly some distance beyond the corresponding edges of the loader tower structure, and to provide added support for this plate so that it may resist the twisting stresses placed upon it by the load, the flanges 26 are provided with inwardly turned ears 32 having auxiliary rollers 33 riding in the aforesaid channels of the tower section 21. Such rollers 33 are provided at the upper and lower ends of both flanges 26 and will ride the vertical faces 34 of the channels in rolling contact therewith to support the plate, without interfering with its up and down motion as just described.

This loader structure 18 is mounted in the opening 14 by a U-shaped carriage having front and rear ends 35 and 36 rigidly connected by a longitudinal back bar 37, and these ends 36 have channels on their opposite front and rear vertical edges as seen in Fig. 1. Vertical panels 38 and 39 are secured to the supports 11—12 and are provided with rollers 40 which ride in the outer channels of the carriage at 35—36, so that this carriage as a whole may have a traverse motion, horizontally and transversely with respect to the direction of travel of the machine. Thus the carriage may be projected in the opening 14 outward toward the open side of the machine and for this purpose there is provided, over each end 35—36 of the carriage, a transversely mounted, hydraulic ram having a cylinder 41 anchored at 42 at its inner end to a lug 43 secured to the backbone unit 13. Projecting then from each cylinder 41 toward the open side of the frame is a plunger 44, which is attached at 45 to a bracket 46 secured to the adjacent end of the carriage, and the arrangement is thus such that the supply of fluid under pressure through conduits 47 to the opposite ends of each cylinder 41 will project the plungers 44 and traverse the carriage out toward the open side of the machine or retract the plungers to pull the carriage back into the opening 14. Carrier plates 48 are provided immediately inside each end 35—36 of the carriage and are provided with rollers 49 by which the plates are travel mounted in the inner channels of said carriage. For traveling these carrier plates 48 I provide at each end of the structure a sprocket chain 50 which operates over sprockets 51 and 52. The sprockets 51 are journaled between brackets 53 depending from the carriage adjacent the back bar 47 and are connected to operate in unison by a heavy, forwardly and rearwardly extending, tubular shaft 54. The sprockets 52 are journaled at 55 in adjustable clips 56 supported in brackets 57, hung from the open ends of the carriage, and this adjustment is, of course, for the purpose of maintaining the chains in a taut condition. Each sprocket chain 50 is secured at 58 to an angle 59 secured to the adjacent panel 38 or 39 and is also attached at its upper flight at a suitable point to the adjacent carrier plate 48, as indicated at 60. The arrangement is thus such that the hereinbefore described traverse motions of the carriage will impart motion to the sprocket chains 50, due to the fact that they are secured to the stationary panels, and thus while the carrier plates 48 will move with the carriage they will also be traversed with respect thereto so that the carrier plates will move toward the open side of the machine and will reach the open end of the carriage as the carriage itself reaches its maximum outer position, and vice-versa. The loader 18 has its inner tower sections 19 rigidly attached by brackets 61 to a heavy torque tube 62, and this tube is secured at its extremities to swingable end plates 63 located alongside each carrier plate 48. Each end plate 63 is then pivoted at 64 at its upper portion to the corresponding upper end of the adjacent carrier plate 48, so that the loader will be supported for travel by these carrier plates, but may swing about the pivots 64 for tilting movement in a vertical, transverse plane. For thus tilting the loader about these pivots 64 I provide the tilting mechanism, best illustrated in Fig. 7, wherein it will be noted that a heavy tie bar 65 is connected to the carrier plates 48 and extends forwardly and rearwardly therebetween. Positioned parallel with this tie bar 65 is a hydraulic ram having a cylinder 66 and plunger 67 and, of course, provided with suitable flexible conduits 68 for supplying fluid to the cylinder to project or retract said plunger. Bracket plates 69 are secured to the opposite ends of the tie bar 65 and carry pivot pins 70 by which toggle links 71 are swingably mounted, and these links at their opposite ends are pivoted at 72 between the ends of toggle links 73. The opposite ends of the links 73 are then pivotally connected at 74 to the opposite ends of the cylinder 66, and plunger 67, and at 75 to lugs carried by the end plates 63. Thus the arrangement is such that the projection of the plunger 67 by fluid entering the cylinder 66 will straighten out the toggle links 71 and 73 to swing the lower ends of the plates 63 toward the open side of the machine, and vice-versa, to accomplish the desired tilting movements of the loader 18, as well as to hold it in any adjusted position.

The traversable carriage and tilting mechanism just described are identical to the corresponding construction in my prior application Serial No. 139,912 and are not believed to require any further description herein.

Also as disclosed in that earlier application the present machine is provided, at its open side and adjacent the front and rear corners of the opening 14, with outwardly and downwardly projectable jacks 76 having feet 77 which may be thrust against the ground in order to support this side of the machine while the load is being raised or lowered, and particularly to bring this support out as far as possible from the open side of the machine. These jacks 76 are hydraulically actuated, but the mechanism for their actuation having been previously described will be omitted herein.

According to the present invention I provide in face to face relation with the aforesaid mounting plate 25 a swingable mounting member or pitch plate 78 of substantially the same shape and size as seen in Fig. 5. At its center and adjacent its upper edge, the plate 78 is swingably suspended upon a heavy pivot 79 anchored in the plate 25, and additional support is provided by guide pins 80, also anchored in the plate 25 adjacent its front and rear ends, and projecting outward through arcuate slots 81 in the plates 78. These slots 81 are curved on arcs centered on the axis of the pivot 79 so as to permit swinging or pitching motions of the plate 78 in a longitudinal, vertical plane with respect to the machine as a whole. For thus moving the plate 78 I then provide a hydraulic ram having a cylinder 82 and plunger 83 which are located above the upper edges of the plates 85—78. At one end the cylinder 82 is pivoted at 84 to one corner of a bell crank 85 and this bell crank is fulcrumed at 86 on a bracket 87 secured to the upper edge of the plate 78. The remaining corner of the bell crank 85 is then pivoted at 88 to the bifurcated upper end of a link 89, the lower end of which is pivotally attached to the guide pin 80 at the adjacent end of the structure. The opposite end of the plunger 83 is likewise pivotally attached at 90 to the corner of a bell crank 91, a second corner of which is fulcrumed at 92 in a bracket 93 secured to the front and upper corner of the plate 78. The remaining corner of the bell crank 91 is then pivoted at 94 in the bifurcated upper end of a similar link 95, the lower end of which is pivotally attached to the aforesaid guide pin 80. Thus the admission of fluid to the opposite ends of the cylinder 82 through the flexible conduits, indicated at 96, will effectively increase or reduce the distance between the upper corners of the bell cranks 85—91, swinging them in opposite directions about their fulcrums 86—92. Such motion of the bell cranks will then be transmitted to the plate 78 to swing it about its pivot 79, since these bell cranks must also swing about their pivot connections to the links 89—95 which are held at lower ends of the guide pins 80. Thus the plate 78 may be pitched about its pivot 79 in opposite directions under control of this pitching mechanism, and the plate is shown in Fig. 5 as tilted upwardly at its forward end.

The plate 78 is stiffened and reinforced by an upper flange 97, having suitable openings 98 to pass the links 89—95, and by vertical pairs of parallel webs 99 at its opposite front and rear ends. These webs 99 provide mountings for the upwardly turned ends 100 of load carrying forks 101 and these ends 100 are detachably mounted between the webs by means of heavy carrier pins 102, so that the forks 101 project outward toward the open side of the machine in parallel relation.

These forks serve as supports for a load holder or skid of elongated rectangular form, comprising a sub-frame designated generally at 103, superimposed upon which is a load supporting or main frame 104. The manner in which the load itself is supported upon the frame 104 is immaterial, and this frame may, of course, be provided with any suitable supporting brackets or clamps according to the nature of the load to be handled. As here shown the load, designated at L, is an elongated cylindrical object, such as a heavy pipe, and it is held on the frame 104 by suitable clamps 105 and cradles 106. The sub-frame 103 is provided with depending clips or socket means 107 at opposite ends and at its inner and outer corners into which the forks 101 fit, as best shown in Fig. 3, in order to support the load holder in its entirety. These clips 107 depend from a base plate 108 on which there rests a top plate 109 having inner and outer flanges 110, and guide rollers 111 are journaled on these flanges. Forming part of the frame 104 are guide channels 112 which face in opposite directions and are travel mounted upon the guide rollers 111, so that the frame 104 may have a fore and aft or translate motion with respect to the sub-frame 103. For thus moving or translating the load holder frame 104 there is provided a hydraulic ram having a cylinder 113 and plunger 114. At one end the cylinder 113 is attached at 115 to a cross bar 116 joining the aforesaid channels 112, and at the opposite end of the ram the plunger 114 is attached at 117 to a bracket 118 secured to the top plate 109. Thus the opposite movement of the plunger 114, by the selective admission of fluid to the opposite ends of the cylinder 113 through flexible conduits 119, will move the frame 104 forward or rearward as the case may be with respect to the top plate 109 which, as will be presently described, is held against corresponding movement with respect to the base plate 109 secured upon the forks 101. The frame 104 further comprises main fore and aft side channels 120 and these are suitably cross connected and braced, as designated throughout at 121.

At their centers the plates 108—109 are connected by a vertical pivot 112 about which the plate 109 and the frame 104, as supported thereon, may be swung in a generally horizontal plane in order to yaw the frame 104 and load, as indicated in Fig. 2. The plate 109 is further provided with arcuate slots 123 in which guide pins 124, secured to the base plate 108, slide in order to hold the plates in proper assembly while permitting these yaw motions. A hydraulic ram comprising a cylinder 125 and plunger 126 is located beneath the plate 109 outwardly of the forks 101, and at one end the cylinder 125 is connected at 127 to a bracket 128 secured to the base plate 108. At the opposite end of the ram the plunger 126 is pivotally connected at 129 to a bracket 130 depending from the exposed lower surface of the plate 109 so that the selective admission of fluid to the opposite ends of the cylinder 125, through the flexible conduits 131, will swing the top plate 109 about its pivot 122 to yaw the load supported upon the frame 104 as will be understood.

It is believed that the operation of the machine as thus far described will be readily apparent and it will, of course, be possible to maneuver and position the load L in no less than six different directions or planes, either selectively or in combination, and all independently of the movement of the machine as a whole. All of these motions are carried out hydraulically and the supply of fluid to the lifting ram cylinders 22 will raise and lower the load, while control of the fluid admission to the cylinders 41 of the traversing rams will traverse the load, so that a load may be picked up from alongside the machine and either raised straight up in a plane parallel with the machine or drawn inward and deposited on the supports 11—12 for transport. Control of the fluid admission to the tilting ram cylinder 66 will control the tilt angle of the load transversely of the machine, while control of the fluid admission to the ram cylinder 82 will pitch the entire load in a plane lengthwise of the machine, or substantially parallel to the direction of travel. Control of fluid supplied to the ram cylinder 113 will then translate or move the load bodily either forward or rearwardly, and finally the control of the fluid supplied to the cylinder 125 will permit the load to be yawed to swing its opposite forward and rearward ends from side to side. As in the machine of my prior application previously identified herein, I provide a control group or valve bank convenient to the operator's station 16, as designated generally at 132, so that the operator seated in the cab 17 may, by the proper manipulation of a set of valve levers, control the fluid flow to and from the various ram cylinders. So that the operator may observe the position of the load the cab 17 is made almost completely of glass or transparent plastic in its upper portion, but in order to obtain the full benefit of the precise control of the movements of the load in all directions it many times will be desirable for an operator to actually ride the load holder, as the load is elevated and maneuvered about, to position it in the desired angle and plane. For this purpose I provide an operator's platform 133 on the forward, inner side of the load holder frame 104, upon which the operator may stand alongside and close to the load itself. A duplicate control group or valve bank 134 is then provided convenient to the hand of an operator standing on this platform, and for the support of this control group I provide a swinging boom 135, on the outer end of which the controls are mounted. This boom 135 has a vertical portion 136 which is swingably mounted in a suitable socket 137 forming part of reinforcements 138 for the flanges 26, and thus while the boom will support the control group 134 independently of the load itself, so that the movements thereof are not interfered with, the boom will nevertheless raise and lower with the load so as to maintain its position convenient to the operator on the platform 133. The necessary cabled, flexible conduits 139 for connecting the control group into the hydraulic system are brought down alongside a vertical standard 140 and their length is such as to permit all of the necessary movements as the load is raised and lowered and moved inward and outward. As best seen in Figs. 2 and 4 the control group 134 has a total of six valve control handles, indicated throughout at 141, for controlling the movements of the load to the six different directions and angles, and while I do not here include a control valve for the manipulation of the jacks 76 from the operator's station on the load holder, such a valve may, of course, be added if desired or required.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A load handling and positioning machine of the character described, comprising in combination, a traveling frame having an opening through one side, a load holder, a loader mechanism mounting the holder for up and down movements in said opening, means mounting the loader mechanism for traverse movements in and out of said opening, means mounting the mechanism for tilting movements in a vertical plane and transverse to the direction of travel of the machine, a horizontal pivot connecting the holder to said mechanism for pitch adjustments in a vertical plane and parallel to the direction of travel, a vertical pivot supporting the load holder for yawing motions in a horizontal plane, rollers supporting the load holder for translate motions parallel with the direction of travel, and separate fluid motors operatively connected to move the load holder in all of said directions.

2. In a load handling and manipulating machine of the character described, a traveling frame and a vertically movable and tiltable and horizontally traversable loader thereon, cooperating plates carried by the loader and a horizontal pivot connecting one plate to the other for pitching motion, fixed pins in one plate and the other having arcuate slots to guide the movements of the movable plate, a fluid motor and means connecting same to the plates for moving the one plate, and a load carrier connected to the movable plate.

3. In a load handling and manipulating machine of the character described, a traveling frame and a vertically movable and tiltable and horizontally traversable loader thereon, cooperating plates carried by the loader and a horizontal pivot connecting one plate to the other for pitching motion, fixed pins in one plate and the other having arcuate slots to guide the movements of the movable plate, a fluid motor and means connecting same to the plates for moving the one plate, and a load carrier connected to the movable plate, the said fluid motor having a cylinder and an extensible and retractable plunger, bell cranks connected to opposite ends of the cylinder and plunger and to one of the plates, and links connecting the bell cranks to the other plate to move the movable plate as the plunger is extended and retracted.

4. In a load handling and manipulating machine of the character described, a traveling frame and a vertically movable and tiltable and horizontally traversable loader thereon, cooperating plates carried by the loader and a horizontal pivot connecting one plate to the other for pitching motion, means for moving the pivoted plate, a load holder having a sub-frame and a supporting frame thereon, means mounting the sub-frame on the pivoted plate, a vertical pivot connecting the frames and means for swinging the supporting frame about said pivot to yaw a load carried on that frame, and one frame having fixed pins and the other having arcuate slots engaging the pins to guide the frame in its yaw movements.

5. In a load handling and manipulating machine of the character described, a traveling frame and a vertically movable and tiltable and horizontally traversable loader thereon, cooperating plates carried by the loader and a horizontal pivot connecting one plate to the other for pitching motion, means for moving the pivoted plate, a load carrier having a sub-frame and a load supporting frame, means connecting the sub-frame to the pivoted plate, a vertical pivot connecting the frames and means for swinging the load supporting frame on that pivot to yaw a load carried by the frame, rollers supporting the load supporting frame on the sub-frame for longitudinal translate movements, and means for moving the load supporting frame on said rollers.

6. In a load handling and manipulating machine of the character described, a traveling frame and a vertically movable and tiltable and horizontally traversable loader thereon, cooperating plates carried by the loader and a horizontal pivot connecting one plate to the other for pitching motion, means for moving the pivoted plate, a load carrier having a sub-frame and a load supporting frame, means connecting the frames and means for swinging the load supporting frame on that pivot to yaw a load carried by the frame, rollers supporting the load supporting frame on the sub-frame for longitudinal translate movements, and means for moving the load supporting frame on said rollers, the said last two mentioned means each comprising a fluid motor having a cylinder and plunger and connected between the sub-frame and load supporting frame.

7. In a load handling and manipulating machine of the character described, a traveling frame and a vertically movable and tiltable and horizontally traversable loader thereon, cooperating plates carried by the loader and a horizontal pivot connecting one plate to the other for pitching motion, means for moving the pivoted plate, a load carrier having a sub-frame and a load supporting frame, means connecting the sub-frame to the pivoted plate, a vertical pivot connecting the frames and means for swinging the load supporting frame on that pivot to yaw a load carried by the frame, the said frame having longitudinal channels and rollers connecting the channels to support the load supporting frame for back and forth translate motions with respect to the sub-frame, and means for moving the load supporting frame on said rollers.

8. In a load handling and manipulating machine of the character described, a traveling frame and a vertically movable and tiltable and horizontally traversable loader thereon, cooperating plates carried by the loader and a horizontal pivot connecting one plate to the other for pitching motion, means for moving the pivoted plate, a load holder having a sub-frame and a supporting frame thereon, means mounting the sub-frame on the pivoted plate, a vertical pivot connecting the frames and means for swinging the supporting frame about said pivot to yaw a load carried on that frame, and one frame having fixed pins and the other having arcuate slots engaging the pins to guide the frame in its yaw movements, the said means mounting the sub-frame on the pivoted plate comprising forks attached to said plate, and the sub-frame having socket means to releasably receive the said forks.

9. In a machine for loading and manipulating materials, a traveling frame having front and rear wheeled supports and connecting means at one side of the frame, a loader mounted between said supports, a load holder, means cooperating with the loader and load holder for moving the latter vertically and horizontally and in angular directions, said means including a plurality of fluid motors and separate controls on the frame for said fluid motors, a platform on the load holder on which an operator may stand and ride with the load, a swingable boom on the loader, and duplicate controls for the fluid motors carried by said boom and held thereby convenient to an operator on the platform.

10. In a machine for loading and manipulating materials, a traveling frame having front and rear wheeled supports and connecting means at one side of the frame, a loader mounted between said supports, a load holder, means cooperating with the loader and load holder for moving the latter vertically and horizontally and in angular directions, said means including a plurality of fluid motors and separate controls on the frame for said fluid motors, an operator's station on the load holder on which an operator may ride with the load, duplicate controls for the fluid motors, and means supporting said duplicate controls independently of the load holder but in position for operation by an operator at said station.

11. In a loader having a frame and loader and a load holder, means including a plurality of fluid motors for moving the load holder in a plurality of directions, a fluid supply system for the fluid motors and including duplicate control groups for controlling the motions of the load holder, separate operator's stations on the frame and load holder, one of said control groups being located adjacent each of said stations, and a swinging boom on the loader and carrying the control group for the operator's station on the load holder.

12. In a loader of the character described, a frame, a vertically telescopic tower on the frame, means for moving the tower up and down, said tower having guide channels, a vertically movable load carrier member and guide rollers mounted thereon for guide engagement with said channels, means for moving the load carrier member, and auxiliary rollers carried by the member and oppositely engaging vertical surfaces of the channels, said auxiliary rollers having axes at right angles to the axes of said guide rollers.

References Cited in the file of this patent

UNITED STATES PATENTS

| | | |
|---|---|---|
| 2,261,483 | Nickles | Nov. 4, 1941 |
| 2,410,373 | Westervelt, Jr. | Oct. 29, 1946 |
| 2,421,472 | Way | June 3, 1947 |
| 2,428,223 | Johnson | Sept. 30, 1947 |
| 2,450,152 | Miller | Sept. 28, 1948 |
| 2,479,623 | Johnson | Aug. 23, 1949 |
| 2,584,240 | Stewart | Feb. 5, 1952 |
| 2,591,544 | Hegarty | Apr. 1, 1952 |
| 2,598,865 | Turner | June 3, 1952 |
| 2,601,092 | Cardiff | June 17, 1952 |
| 2,613,822 | Stanley | Oct. 14, 1952 |
| 2,620,930 | Mullgardt | Dec. 9, 1952 |
| 2,621,811 | Lull | Dec. 16, 1952 |